(12) United States Patent
Canberk et al.

(10) Patent No.: US 12,472,435 B2
(45) Date of Patent: Nov. 18, 2025

(54) EXTERNAL CONTROLLER FOR AN EYEWEAR DEVICE

(71) Applicant: Snap Inc., Santa Monica, CA (US)

(72) Inventors: Ilteris Kaan Canberk, Marina Del Rey, CA (US); Matthew Hallberg, Los Angeles, CA (US); William Miles Miller, San Francisco, CA (US); Lien Le Hong Tran, Santa Monica, CA (US); Michael Benson Tucker, Marina Del Rey, CA (US)

(73) Assignee: SNAP INC., Santa Monica, CA (US)

( * ) Notice: Subject to any disclaimer, the term of this patent is extended or adjusted under 35 U.S.C. 154(b) by 117 days.

(21) Appl. No.: 17/887,215

(22) Filed: Aug. 12, 2022

(65) Prior Publication Data

US 2024/0050856 A1 Feb. 15, 2024

(51) Int. Cl.
| | | |
|---|---|---|
| A63F 13/211 | (2014.01) | |
| A63F 13/533 | (2014.01) | |
| A63F 13/573 | (2014.01) | |
| A63F 13/655 | (2014.01) | |
| G02B 27/01 | (2006.01) | |

(Continued)

(52) U.S. Cl.
CPC .......... *A63F 13/655* (2014.09); *A63F 13/211* (2014.09); *A63F 13/533* (2014.09); *A63F 13/573* (2014.09); *G02B 27/0172* (2013.01); *G06F 3/0346* (2013.01); *G06F 3/04815* (2013.01); *G06F 3/0482* (2013.01); *G06F 3/04845* (2013.01); *G06F 3/0488* (2013.01); *G06T 7/20* (2013.01); *G06V 20/20* (2022.01); *A63F 2300/105* (2013.01); *A63F 2300/308* (2013.01); *A63F 2300/646* (2013.01);

(Continued)

(58) Field of Classification Search
None
See application file for complete search history.

(56) References Cited

U.S. PATENT DOCUMENTS

| 5,604,843 A | 2/1997 | Shaw et al. |
| 5,689,559 A | 11/1997 | Park |

(Continued)

FOREIGN PATENT DOCUMENTS

| CN | 109863532 | 6/2019 |
| CN | 110168478 | 8/2019 |

(Continued)

OTHER PUBLICATIONS

"U.S. Appl. No. 17/248,981, Non Final Office Action mailed Sep. 30, 2021", 30 pgs.

(Continued)

*Primary Examiner* — Damon J Pierce
(74) *Attorney, Agent, or Firm* — SCHWEGMAN LUNDBERG & WOESSNER, P.A.

(57) ABSTRACT

Systems and methods are provided for using an external controller with an AR device. The system establishes, by one or more processors of the AR device, a communication with an external client device. The system overlays, by the AR device, a first AR object on a real-world environment being viewed using the AR device. The system receives interaction data from the external client device representing one or more inputs received by the external client device and, in response, modifies the first AR object by the AR device.

20 Claims, 12 Drawing Sheets

(51) Int. Cl.
    *G06F 3/0346*     (2013.01)
    *G06F 3/04815*     (2022.01)
    *G06F 3/0482*     (2013.01)
    *G06F 3/04845*     (2022.01)
    *G06F 3/0488*     (2022.01)
    *G06T 7/20*     (2017.01)
    *G06V 20/20*     (2022.01)

(52) U.S. Cl.
    CPC .. *A63F 2300/695* (2013.01); *G02B 2027/014* (2013.01); *G02B 2027/0178* (2013.01)

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,430,310 B1 | 4/2013 | Ho et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,191,620 B1 | 11/2015 | Katzer et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,269,180 B2 | 4/2019 | Yamamoto et al. |
| 10,348,662 B2 | 7/2019 | Baldwin et al. |
| 10,362,219 B2 | 7/2019 | Wilson et al. |
| 10,387,484 B2 | 8/2019 | Kennedy et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,572,005 B2 | 2/2020 | Zahn et al. |
| 10,573,048 B2 | 2/2020 | Ni et al. |
| 10,645,092 B1 | 5/2020 | Bonar et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,764,053 B2 | 9/2020 | Brook et al. |
| 10,805,248 B2 | 10/2020 | Luo et al. |
| 10,857,450 B1 | 12/2020 | Aman et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,055,891 B1 | 7/2021 | Ofek et al. |
| 11,063,891 B2 | 7/2021 | Voss |
| 11,069,103 B1 | 7/2021 | Blackstock et al. |

(56) References Cited

U.S. PATENT DOCUMENTS

| | | |
|---|---|---|
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,233,799 B1 | 1/2022 | Whyte et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,360,733 B2 | 6/2022 | Cardenas Gasca et al. |
| 11,452,939 B2 | 9/2022 | Tham et al. |
| 11,553,049 B2 | 1/2023 | Tsuji |
| 11,812,194 B1 | 11/2023 | Vandyke et al. |
| 11,893,301 B2 | 2/2024 | Cardenas Gasca et al. |
| 12,051,163 B2 | 7/2024 | Canberk et al. |
| 12,229,901 B2 | 2/2025 | Canberk et al. |
| 12,236,512 B2 | 2/2025 | Tran et al. |
| 12,284,698 B2 | 4/2025 | Zhuang et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0094417 A1 | 4/2008 | Cohen |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0214585 A1 | 8/2012 | Paquet |
| 2013/0044129 A1 | 2/2013 | Latta et al. |
| 2013/0103760 A1 | 4/2013 | Golding et al. |
| 2013/0134212 A1 | 5/2013 | Chang |
| 2013/0201187 A1 | 8/2013 | Tong et al. |
| 2013/0249948 A1 | 9/2013 | Reitan |
| 2013/0257877 A1 | 10/2013 | Davis |
| 2013/0286004 A1 | 10/2013 | Mcculloch et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0281522 A1 | 9/2014 | Bortnem et al. |
| 2015/0062162 A1 | 3/2015 | Kim et al. |
| 2015/0126281 A1* | 5/2015 | Lewis .................. A63F 13/213 |
| | | 351/158 |
| 2015/0206349 A1 | 7/2015 | Rosenthal et al. |
| 2015/0306496 A1 | 10/2015 | Haseltine |
| 2016/0021148 A1 | 1/2016 | Ijaz |
| 2016/0134840 A1 | 5/2016 | Mcculloch |
| 2016/0232715 A1 | 8/2016 | Lee |
| 2016/0234149 A1 | 8/2016 | Tsuda et al. |
| 2016/0346612 A1 | 12/2016 | Rowley |
| 2017/0038829 A1 | 2/2017 | Lanier et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0192495 A1 | 7/2017 | Drinkwater et al. |
| 2017/0199855 A1 | 7/2017 | Fishbeck |
| 2017/0235848 A1 | 8/2017 | Van Deusen et al. |
| 2017/0307889 A1 | 10/2017 | Newman |
| 2017/0310934 A1 | 10/2017 | Du et al. |
| 2017/0312634 A1 | 11/2017 | Ledoux et al. |
| 2017/0322655 A1 | 11/2017 | Stafford |
| 2017/0354875 A1 | 12/2017 | Marks et al. |
| 2018/0033204 A1* | 2/2018 | Dimitrov ................ G06T 15/20 |
| 2018/0034867 A1 | 2/2018 | Zahn et al. |
| 2018/0047200 A1 | 2/2018 | O'hara et al. |
| 2018/0088663 A1 | 3/2018 | Zhang et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0239144 A1 | 8/2018 | Woods et al. |
| 2018/0268589 A1 | 9/2018 | Grant |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0315247 A1 | 11/2018 | Van Andel |
| 2018/0350144 A1 | 12/2018 | Rathod |
| 2018/0350150 A1 | 12/2018 | Powderly et al. |
| 2019/0001223 A1 | 1/2019 | Blackstock et al. |
| 2019/0054379 A1 | 2/2019 | Ackley et al. |
| 2019/0057616 A1 | 2/2019 | Cohen et al. |
| 2019/0066387 A1 | 2/2019 | Grossmann et al. |
| 2019/0087801 A1 | 3/2019 | Govindarajan et al. |
| 2019/0097958 A1 | 3/2019 | Collet et al. |
| 2019/0151757 A1 | 5/2019 | Kozloski et al. |
| 2019/0188920 A1 | 6/2019 | Mcphee et al. |
| 2019/0222654 A1 | 7/2019 | Singhal et al. |
| 2019/0272674 A1 | 9/2019 | Comer et al. |
| 2019/0280997 A1 | 9/2019 | Baldwin et al. |
| 2019/0295320 A1 | 9/2019 | Ghatak et al. |
| 2019/0310757 A1 | 10/2019 | Lee et al. |
| 2019/0311513 A1 | 10/2019 | Han et al. |
| 2019/0318540 A1 | 10/2019 | Piemonte et al. |
| 2019/0356705 A1 | 11/2019 | Escudero et al. |
| 2020/0005026 A1 | 1/2020 | Andersen et al. |
| 2020/0059502 A1 | 2/2020 | Iyer et al. |
| 2020/0066049 A1 | 2/2020 | Sun et al. |
| 2020/0073483 A1 | 3/2020 | Berenzweig et al. |
| 2020/0089313 A1 | 3/2020 | Himane |
| 2020/0098187 A1 | 3/2020 | Herscher et al. |
| 2020/0162851 A1 | 5/2020 | Wilde |
| 2020/0167120 A1 | 5/2020 | Rakshit et al. |
| 2020/0306637 A1 | 10/2020 | Baldwin et al. |
| 2020/0360823 A1 | 11/2020 | Cahill et al. |
| 2020/0372127 A1 | 11/2020 | Denton et al. |
| 2020/0410575 A1 | 12/2020 | Grantham et al. |
| 2021/0019739 A1 | 1/2021 | Almonte et al. |
| 2021/0042724 A1 | 2/2021 | Rathod |
| 2021/0043005 A1 | 2/2021 | Arora et al. |
| 2021/0051147 A1 | 2/2021 | Hardy et al. |
| 2021/0074047 A1 | 3/2021 | Sheth et al. |
| 2021/0089179 A1 | 3/2021 | Grantham et al. |
| 2021/0097286 A1 | 4/2021 | Lehrich et al. |
| 2021/0104087 A1 | 4/2021 | Smith et al. |
| 2021/0118231 A1 | 4/2021 | Hutten et al. |
| 2021/0119884 A1 | 4/2021 | Kim et al. |
| 2021/0124180 A1 | 4/2021 | Amadio |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |

(56) References Cited

U.S. PATENT DOCUMENTS

| | | | |
|---|---|---|---|
| 2021/0248827 A1 | 8/2021 | Baier et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0362029 A1 | 11/2021 | Koblin et al. |
| 2021/0364811 A1 | 11/2021 | Amadio |
| 2021/0385180 A1 | 12/2021 | Al Majid et al. |
| 2021/0398314 A1 | 12/2021 | Sivalingam et al. |
| 2021/0405831 A1 | 12/2021 | Mourkogiannis et al. |
| 2021/0409535 A1 | 12/2021 | Mourkogiannis et al. |
| 2021/0409954 A1 | 12/2021 | Frisk et al. |
| 2022/0012929 A1 | 1/2022 | Blackstock et al. |
| 2022/0030197 A1 | 1/2022 | Ishimoto |
| 2022/0075591 A1 | 3/2022 | Cardenas Gasca et al. |
| 2022/0092857 A1 | 3/2022 | Haapoja et al. |
| 2022/0101000 A1 | 3/2022 | Tham et al. |
| 2022/0157002 A1 | 5/2022 | Gelencser |
| 2022/0179665 A1 | 6/2022 | Rathod |
| 2022/0222881 A1 | 7/2022 | Nakade et al. |
| 2022/0276823 A1 | 9/2022 | Cardenas Gasca et al. |
| 2023/0418542 A1 | 12/2023 | Cardenas Gasca et al. |
| 2024/0032121 A1 | 1/2024 | Zhuang et al. |
| 2024/0070950 A1 | 2/2024 | Tran et al. |
| 2024/0071000 A1 | 2/2024 | Canberk et al. |
| 2024/0119679 A1 | 4/2024 | Canberk et al. |
| 2024/0221212 A1 | 7/2024 | Evangelidis |
| 2024/0338910 A1 | 10/2024 | Canberk et al. |
| 2025/0139919 A1 | 5/2025 | Canberk et al. |
| 2025/0148683 A1 | 5/2025 | Tran et al. |

FOREIGN PATENT DOCUMENTS

| | | |
|---|---|---|
| CN | 116113478 A | 5/2023 |
| CN | 119677566 A | 3/2025 |
| CN | 119768759 A | 4/2025 |
| CN | 119768841 A | 4/2025 |
| CN | 119923882 A | 5/2025 |
| CN | 119998767 A | 5/2025 |
| EP | 2184092 | 5/2010 |
| JP | 2001230801 | 8/2001 |
| JP | 5497931 | 3/2014 |
| KR | 20120040000 A | 4/2012 |
| KR | 101445263 | 9/2014 |
| KR | 20210121616 A | 10/2021 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | WO-2013064854 A1 | 5/2013 |
| WO | 2013152454 | 10/2013 |
| WO | 2013166588 | 11/2013 |
| WO | 2014031899 | 2/2014 |
| WO | WO-2014182638 A2 | 11/2014 |
| WO | 2014194439 | 12/2014 |
| WO | WO-2015094220 A1 | 6/2015 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | WO-2020017682 A1 | 1/2020 |
| WO | 2022056132 | 3/2022 |
| WO | WO-2022170222 A1 | 8/2022 |
| WO | WO-2024020389 A1 | 1/2024 |
| WO | WO-2024035763 A1 | 2/2024 |
| WO | WO-2024044138 A1 | 2/2024 |
| WO | WO-2024044184 A1 | 2/2024 |
| WO | WO-2024076613 A1 | 4/2024 |
| WO | WO-2024145124 A1 | 7/2024 |

OTHER PUBLICATIONS

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"U.S. Appl. No. 17/248,981, Response filed Dec. 20, 2021 to Non Final Office Action mailed Sep. 30, 2021", 11 pgs.

"U.S. Appl. No. 17/248,981, Notice of Allowance mailed Feb. 16, 2022", 12 pgs.

"International Application Serial No. PCT/US2021/049672, Invitation to Pay Additional Fees mailed Jan. 14, 2022", 15 pgs.

"International Application Serial No. PCT/US2021/049672, International Search Report mailed Mar. 9, 2022", 6 pgs.

"International Application Serial No. PCT/US2021/049672, Written Opinion mailed Mar. 9, 2022", 15 pgs.

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

"Manage Your Bitmoji", Snapchat Support, [Online] Retrieved from the Internet: <URL: https://web.archive.org/web/20190503063620/https://support.snapchat.com/en-us/a/manage-bitmoji>, (captured May 3, 2019), 3 pgs.

"Bitmoji Family", Snapchat Support, [Online] Retrieved from the Internet: <URL: https://web.archive.org/web/20190503063620/https://support.snapchat.com/en-us/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

"Instant Comics Starring You and Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"U.S. Appl. No. 17/663,594, Non Final Office Action mailed Sep. 29, 2022", 65 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

(56) References Cited

OTHER PUBLICATIONS

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmojicustomizable- geofilters-2448152>, (Nov. 18, 2016), 6 pgs.
"U.S. Appl. No. 17/813,901, Non Final Office Action mailed Aug. 22, 2024", 10 pgs.
"U.S. Appl. No. 17/893,696, Notice of Allowance mailed Aug. 21, 2024", 11 pgs.
"U.S. Appl. No. 17/960,627, Examiner Interview Summary mailed Sep. 9, 2024", 2 pgs.
"U.S. Appl. No. 18/243,815, Final Office Action mailed Aug. 7, 2024", 73 pgs.
"International Application Serial No. PCT/US2023/085194, International Search Report mailed May 28, 2024", 5 pgs.
"International Application Serial No. PCT/US2023/085194, Written Opinion mailed May 28, 2024", 7 pgs.
Kam, Jae Won, et al., "Robust and Fast Collaborative Augmented Reality Framework Based on Monocular SLAM", IEIE Transactions on Smart Processing &Computing, vol. 9, No. 4, (Aug. 31, 2020), 325-335.
Miller, John, et al., "Cappella Establishing Multi-User Augmented Reality Sessions Using Inertial Estimates and Peer-to-Peer Ranging", 21st ACM/IEEE International Conference on Information Processing in Sensor Networks (IPSN), IEEE, (May 4, 2022), 428-440.
Ran, Xukan Xran, et al., "Multi-user augmented reality with communication efficient and spatially consistent virtual objects", Proceedings of the IEEE/ACM 42nd International Conference on Software Engineering Workshops, Acmpub27, New York, NY, USA,, (Nov. 23, 2020), 386-398.
"U.S. Appl. No. 17/663,594, Advisory Action mailed Jun. 7, 2023", 4 pgs.
"U.S. Appl. No. 17/663,594, Examiner Interview Summary mailed Jun. 27, 2023", 2 pgs.
"U.S. Appl. No. 17/663,594, Final Office Action mailed Apr. 4, 2023", 51 pgs.
"U.S. Appl. No. 17/663,594, Notice of Allowability mailed Jan. 3, 2024", 3 pgs.
"U.S. Appl. No. 17/663,594, Notice of Allowance mailed Aug. 9, 2023", 14 pgs.
"U.S. Appl. No. 17/663,594, Response filed May 9, 2023 to Final Office Action mailed Apr. 4, 2023", 12 pgs.
"U.S. Appl. No. 17/663,594, Response filed Jun. 29, 2023 to Advisory Action mailed Jun. 7, 2023", 13 pgs.
"U.S. Appl. No. 17/663,594, Response filed Dec. 29, 2022 to Non Final Office Action mailed Sep. 29, 2022", 11 pgs.
"U.S. Appl. No. 17/893,696, Examiner Interview Summary mailed Jul. 1, 2024", 2 pgs.
"U.S. Appl. No. 17/893,696, Final Office Action mailed May 3, 2024", 15 pgs.
"U.S. Appl. No. 17/893,696, Non Final Office Action mailed Jan. 12, 2024", 16 pgs.
"U.S. Appl. No. 17/893,696, Response filed Feb. 27, 2024 to Non Final Office Action mailed Jan. 12, 2024", 11 pgs.
"U.S. Appl. No. 17/893,696, Response filed Jul. 3, 2024 to Final Office Action mailed May 3, 2024", 9 pgs.
"U.S. Appl. No. 17/895,449, Non Final Office Action mailed Jun. 8, 2023", 9 pgs.
"U.S. Appl. No. 17/895,449, Notice of Allowance mailed Mar. 18, 2024", 5 pgs.
"U.S. Appl. No. 17/895,449, Notice of Allowance mailed Dec. 7, 2023", 9 pgs.
"U.S. Appl. No. 17/895,449, Response filed Aug. 16, 2023 to Non Final Office Action mailed Jun. 8, 2023", 10 pgs.
"U.S. Appl. No. 17/895,449, Supplemental Notice of Allowability mailed Dec. 21, 2023", 2 pgs.
"U.S. Appl. No. 17/960,627, Non Final Office Action mailed Jun. 21, 2024", 11 pgs.
"U.S. Appl. No. 18/243,815, Examiner Interview Summary mailed Jun. 14, 2024", 2 pgs.
"U.S. Appl. No. 18/243,815, Non Final Office Action mailed Apr. 19, 2024", 45 pgs.
"U.S. Appl. No. 18/243,815, Response filed Jun. 20, 2024 to Non Final Office Action mailed Apr. 19, 2024", 13 pgs.
"International Application Serial No. PCT/US2021/049672, International Preliminary Report on Patentability mailed Mar. 23, 2023", 17 pgs.
"International Application Serial No. PCT/US2023/029814, International Search Report mailed Jan. 9, 2024", 6 pgs.
"International Application Serial No. PCT/US2023/029814, Invitation to Pay Additional Fees mailed Nov. 9, 2023", 6 pgs.
"International Application Serial No. PCT/US2023/029814, Written Opinion mailed Jan. 9, 2024", 8 pgs.
"International Application Serial No. PCT/US2023/030711, International Search Report mailed Dec. 12, 2023", 3 pgs.
"International Application Serial No. PCT/US2023/030711, Written Opinion mailed Dec. 12, 2023", 4 pgs.
"International Application Serial No. PCT/US2023/030818, International Search Report mailed Nov. 28, 2023", 3 pgs.
"International Application Serial No. PCT/US2023/030818, Written Opinion mailed Nov. 28, 2023", 5 pgs.
"International Application Serial No. PCT/US2023/034437, International Search Report mailed Dec. 13, 2023", 4 pgs.
"International Application Serial No. PCT/US2023/034437, Written Opinion mailed Dec. 13, 2023", 6 pgs.
"International Application Serial No. PCT/US2023/070415, International Search Report mailed Nov. 3, 2023", 5 pgs.
"International Application Serial No. PCT/US2023/070415, Written Opinion mailed Nov. 3, 2023", 4 pgs.
"U.S. Appl. No. 17/960,627, Response filed Sep. 19, 2024 to Non Final Office Action mailed Jun. 21, 2024", 9 pgs.
"U.S. Appl. No. 18/243,815, Response filed Oct. 7, 2024 to Final Office Action mailed Aug. 7, 2024", 13 pgs.
"U.S. Appl. No. 17/960,627, Notice of Allowance mailed Oct. 8, 2024", 7 pgs.
"U.S. Appl. No. 18/243,815, Advisory Action mailed Oct. 23, 2024", 4 pgs.
"U.S. Appl. No. 17/813,901, Corrected Notice of Allowance mailed Dec. 20, 2024", 5 pgs.
"U.S. Appl. No. 17/813,901, Notice of Allowance mailed Dec. 19, 2024", 8 pgs.
"U.S. Appl. No. 17/893,696, Corrected Notice of Allowability mailed Dec. 27, 2024", 5 pgs.
"U.S. Appl. No. 17/893,696, Notice of Allowance mailed Dec. 2, 2024", 8 pgs.
"International Application Serial No. PCT/US2023/070415, International Preliminary Report on Patentability mailed Jan. 30, 2025", 6 pgs.
"Korean Application Serial No. 10-2023-7011672, Notice of Preliminary Rejection mailed Jan. 9, 2025", W/English Translation, 30 pgs.
Pierdicca, Roberto, et al., "The use of augmented reality glasses for the application in industry 4.0", Augmented Reality, Virtual Reality, and Computer Graphics: 4th International Conference, AVR, Ugento, Italy, Proceedings, Part I 4. Springer International Publishing, (Jun. 12-15, 2017), 13 pgs.
"U.S. Appl. No. 17/813,901, 312 Amendment filed Mar. 6, 2025", 6 pgs.
"U.S. Appl. No. 17/813,901, Corrected Notice of Allowability mailed Mar. 13, 2025", 6 pgs.
"U.S. Appl. No. 17/813,901, PTO Response to Rule 312 Communication mailed Mar. 15, 2025", 1 page.
"Chinese Application Serial No. 202380054612.6, Notification to Make Rectification mailed Mar. 6, 2025", w/ English machine translation, 2 pgs.
"Chinese Application Serial No. 202380054612.6, Response filed Apr. 7, 2025 to Notification to Make Rectification mailed Mar. 6, 2025", W/English Claims, 14 pgs.
"International Application Serial No. PCT/US2023/030711, International Preliminary Report on Patentability mailed Mar. 6, 2024", 6 pgs.

(56) References Cited

OTHER PUBLICATIONS

"International Application Serial No. PCT/US2023/030818, International Preliminary Report on Patentability mailed Mar. 6, 2025", 7 pgs.

"International Application Serial No. PCT/US2023/034437, International Preliminary Report on Patentability mailed Apr. 17, 2025", 8 pgs.

"Korean Application Serial No. 10-2023-7011672, Response filed Mar. 7, 2025 to Notice of Preliminary Rejection mailed Jan. 9, 2025", W/English Claims, 31 pgs.

\* cited by examiner

EXTERNAL CONTROLLER FOR AN EYEWEAR DEVICE

BACKGROUND

Some electronics-enabled eyewear devices, such as so-called smart glasses, allow users to interact with virtual content (e.g., augmented reality (AR) objects) while a user is engaged in some activity. Users wear the eyewear devices and can view a real-world environment through the eyewear devices while interacting with the virtual content that is displayed by the eyewear devices.

BRIEF DESCRIPTION OF THE DRAWINGS

Various ones of the appended drawings merely illustrate examples of the present disclosure and should not be considered as limiting its scope.

DETAILED DESCRIPTION

Figure 1:
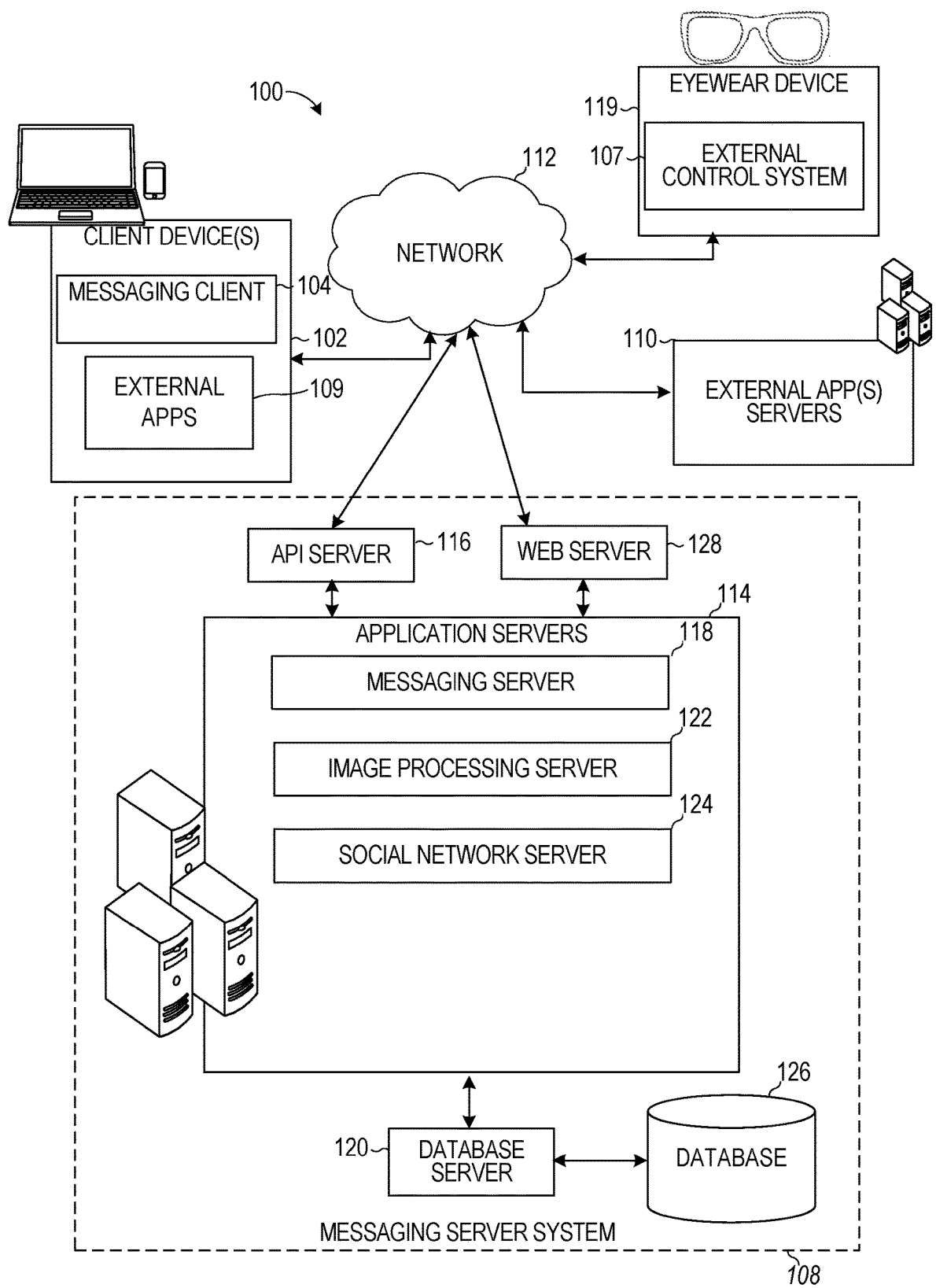
FIG. 1 is a diagrammatic representation of a networked environment in which the present disclosure may be deployed, in accordance with some examples.

The description that follows discusses illustrative examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Typical smart glasses platforms allow users to interact with various types of virtual content. Such platforms are configured to display the virtual content in the lenses of the smart glasses over a real-world environment seen through the lenses of the smart glasses. To interact with the virtual content, the smart glasses typically include an embedded sensor. The smart glasses can detect touch or swipe inputs based on the information detected by the embedded sensor and can then update a display of the virtual content. The interaction with the embedded sensor to perform various modifications of the virtual content is not very intuitive and has a very steep learning curve. As a result, users are unable to accurately perform various desired interactions with the virtual content which takes away from the overall experience of the user. Also, because of the steep learning curve, users typically have to re-perform certain actions multiple times until they learn how to use the sensors, which wastes resources of the smart glasses.

Certain smart glasses platforms use hand or gesture recognition to allow users to interact with the virtual content. Specifically, the smart glasses can detect hand gestures in images captured by the smart glasses and can perform corresponding modifications to the virtual content. Learning how to properly make such gestures also involves a steep learning curve and can also be non-intuitive. Also, performing image processing to detect hand gestures involves multiple machine learning models which consumes a great deal of hardware resources of the smart glasses which can be wasteful and drain the battery of the smart glasses. This can also lead to non-use of the smart glasses and takes away from the overall enjoyment of using the smart glasses.

The disclosed examples improve the efficiency of using the electronic device by providing an AR system that allows users to interact with virtual content or AR objects displayed by the AR devices using a familiar external controller, such as a smartphone or other touch-screen device. The external controller can present options on the screen of the external controller and can detect input that selects the options or moves the external controller in some familiar way. The external controller can provide interaction data to the AR device representing the inputs or movement detected by the external controller and the AR device can then perform corresponding modifications to one or more displayed AR objects.

Specifically, the disclosed techniques establish, by the one or more processors of an augmented reality (AR) device, a communication with an external client device. The disclosed techniques overlay, by the AR device, a first AR object on a real-world environment being viewed using the AR device. The disclosed techniques receive interaction data from the external client device representing one or more inputs received by the external client device and, in response, modify the first AR object by the AR device.

In this way, the disclosed examples increase the efficiencies of the electronic device by reducing the amount of pages of information and inputs needed to accomplish a task and reducing running complex image processing algorithms on the AR device. The disclosed examples further increase the efficiency, appeal, and utility of electronic AR devices, such as eyewear devices. While the disclosed examples are provided within a context of electronic eyewear devices, similar examples can be applied to any other type of AR wearable device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

In some examples, the messaging system 100 includes an eyewear device 119, which hosts an external control system 107, among other applications. Any number of eyewear devices 119 can be included in the messaging system 100 although only one instance of the eyewear device 119 is shown.

The eyewear device 119 can represent any type of AR device that is worn by a user, such as AR glasses, an AR hat, an AR watch, an AR belt, an AR ring, an AR bracelet, AR earrings, and/or an AR headset. The eyewear device 119 is communicatively coupled to the client device 102 via the network 112 (which may include via a dedicated short-range communication path, such as a Bluetooth™ or WiFi direct connection). In some examples, the client device 102 includes a messaging client 104 that implements a vision system and/or an input system. The vision system can include one or more machine learning models that have been trained based on training data to detect people or humans and body movement of the people or humans and facial expressions. Specifically, the vision system can capture one or more images that depict a person. The vision system can process the one or more images using the trained machine learning models to identify and segment one or more human objects from the images. The segmented human objects are then processed to identify three-dimensional (3D) positions of limbs and joints and to detect positioning of different facial features representing different facial expressions. The vision system of the client device 102 can provide movement information to the eyewear device 119 (e.g., the external control system 107 of the eyewear device 119) that includes the 3D positions of the limbs and joins and the positioning of the facial features.

The external control system 107 enables a user to control one or more AR objects presented by the eyewear device 119 based on interaction information received from the client device 102. Specifically, the eyewear device 119 can establish, by one or more processors of the eyewear device 119, a communication with an external client device, such as the client device 102. The eyewear device 119 overlays a first AR object on a real-world environment being viewed using the eyewear device 119, such as through lenses of the eyewear device 119. The eyewear device 119 receives interaction data from the client device 102 representing one or more inputs received by the client device 102 and, in response, modifies the first AR object.

In some examples, the client device 102 includes a smartphone. In some examples, the eyewear device 119 detects a depiction of the client device 102 in one or more images of the real-world environment captured by the eyewear device 119. The eyewear device 119 selects a game controller associated with an external gaming console and presents the game controller as the first AR object on top of the depiction of the client device 102 in the one or more images. In some cases, the eyewear device 119 presents a virtual game controller to represent the physical game controller and/or gaming console.

In some examples, the eyewear device 119 detects a depiction of one or more fingers on a portion of the game controller. The eyewear device 119 identifies one or more buttons of the game controller at a position where the depiction of the one or more fingers is detected and performs or causes to be performed a gaming function corresponding to the identified one or more buttons on the gaming console. In some examples, the eyewear device 119 transmits a communication to the gaming console that identifies the gaming function corresponding to the identified one or more buttons over which the depiction of the one or more fingers is detected.

In some examples, the real-world environment being viewed using the AR device includes the client device 102. In such cases, the first AR object includes an AR beam that extends away from the client device 102. In some examples, the eyewear device 119 detects three-dimensional (3D) movement of the client device 102 based on the received interaction data and updates a direction of the AR beam based on the 3D movement.

In some examples, the client device 102 receives sensor data including at least one of one or more accelerometer measurements or one or more gyroscopic measurements. The client device 102 generates the interaction data based on the sensor data. In some examples, the eyewear device 119 detects the 3D movement by: receiving one or more images depicting the external client device by a camera of the eyewear device 119 and applying image processing including visual odometry to the one or more images to track a position of the client device 102 in 3D space. In some implementations, the eyewear device 119 receives 3D position and rotation of the client device 102 via a wireless communication channel. The client device 102 may use a camera and sensors of the client device 102 to run visual inertial odometry in order to calculate and send a 3D pose of the client device 102 to the eyewear device 119.

In some examples, the real-world environment being viewed using the eyewear device 119 includes the client device 102. In such cases, the eyewear device 119 detects 3D movement of the client device 102 based on the received interaction data. The interaction data can be generated based on sensor data including at least one of one or more accelerometer measurements or one or more gyroscopic measurements of the client device 102. In such cases, the eyewear device 119 propels (animates propelling) the first AR object towards a direction of the 3D movement at a rate corresponding to a rate of the 3D movement.

In some examples, the eyewear device 119 causes the client device 102 to display a marker. The eyewear device 119 captures an image of the marker displayed by the client device 102 and establishes a common coordinate system between the client device 102 and the eyewear device 119 in response to capturing the image of the marker. In some examples, the client device 102 determines a first origin 3D position of the client device 102 relative to the common coordinate system based on a current measurement obtained from one or more sensors of the client device 102. The eyewear device 119 determines a second origin 3D position of the AR device relative to the common coordinate system based on a position of the marker in the image.

In some examples, the eyewear device 119 overlays a second AR object including a wand on the real-world environment being viewed using the eyewear device 119. The eyewear device 119 animates movement of the first AR object towards the eyewear device 119 along a trajectory. The eyewear device 119 detects, based on the interaction data, movement of the client device 102. The eyewear device 119, using the common coordinate system, determines a current 3D position of the client device 102 based on the detected movement and updates an orientation of the second AR object based on the detected movement and the current 3D position.

In some examples, the eyewear device 119 determines that the current 3D position of the client device 102 causes the updated orientation of the second AR object to correspond to a current position of the first AR object. This can represent virtual contact between the second AR object extended out of the client device 102 and the first AR object. In response to determining that the updated orientation of the second AR object corresponds to the current position of the first AR object, the eyewear device 119 modifies the trajectory of the first AR object.

In some examples, the eyewear device 119 causes the client device 102 to display an option on a screen of the client device 102. The eyewear device 119 determines that the interaction data indicates that the option has been selected on the external client device (e.g., that the option has been tapped by a finger of a user). In response to determining that the interaction data indicates that the option has been selected on the client device 102, the client device 102 causes the first AR object to be presented on the eyewear device 119.

In some examples, the eyewear device 119 determines that the interaction data indicates that a swipe input has been received by the client device 102. The swipe input can cause a 3D carousel displayed by the eyewear device 119 to be animated representing different visual properties of the first AR object. The eyewear device 119 changes a visual property of the first AR object in response to determining that the interaction data indicates that the swipe input has been received by the client device 102.

In some examples, the eyewear device 119 causes the client device 102 to display an option on a screen of the client device 102. The eyewear device 119 determines that the interaction data indicates that the option continues to be selected on the external client device by a press-and-hold operation. In response to determining that the interaction data indicates that the option continues to be selected on the client device 102, the eyewear device 119 presents a trackpad on the client device 102 including one or more options to change a 3D position of the first AR object. In some examples, the eyewear device 119 rotates the first AR object about an axis of the first AR object in response to a first swipe motion along a first direction of the trackpad (e.g., a left/right swipe motion). The eyewear device 119 modifies a 3D perceived distance (e.g., 3D depth) between the first AR object and the eyewear device 119 in response to a second swipe motion along a second direction of the trackpad.

A messaging client 104 is able to communicate and exchange data with other messaging clients 104, the eyewear device 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding augmented reality experience. Launching the AR experience includes obtaining one or more augmented reality items associated with the AR experience and overlaying the augmented reality items on top of the images or video being presented.

Figure 3:
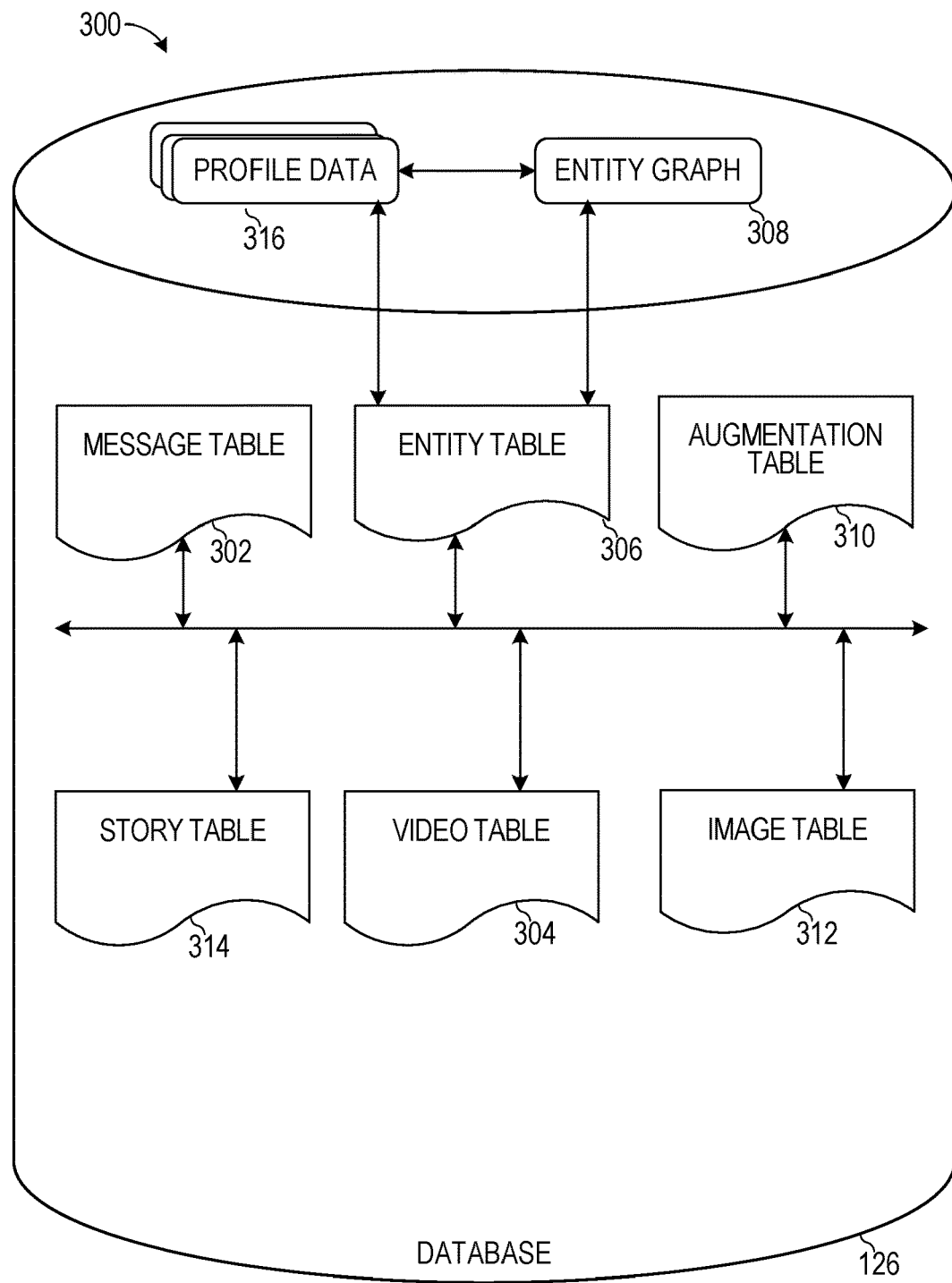
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
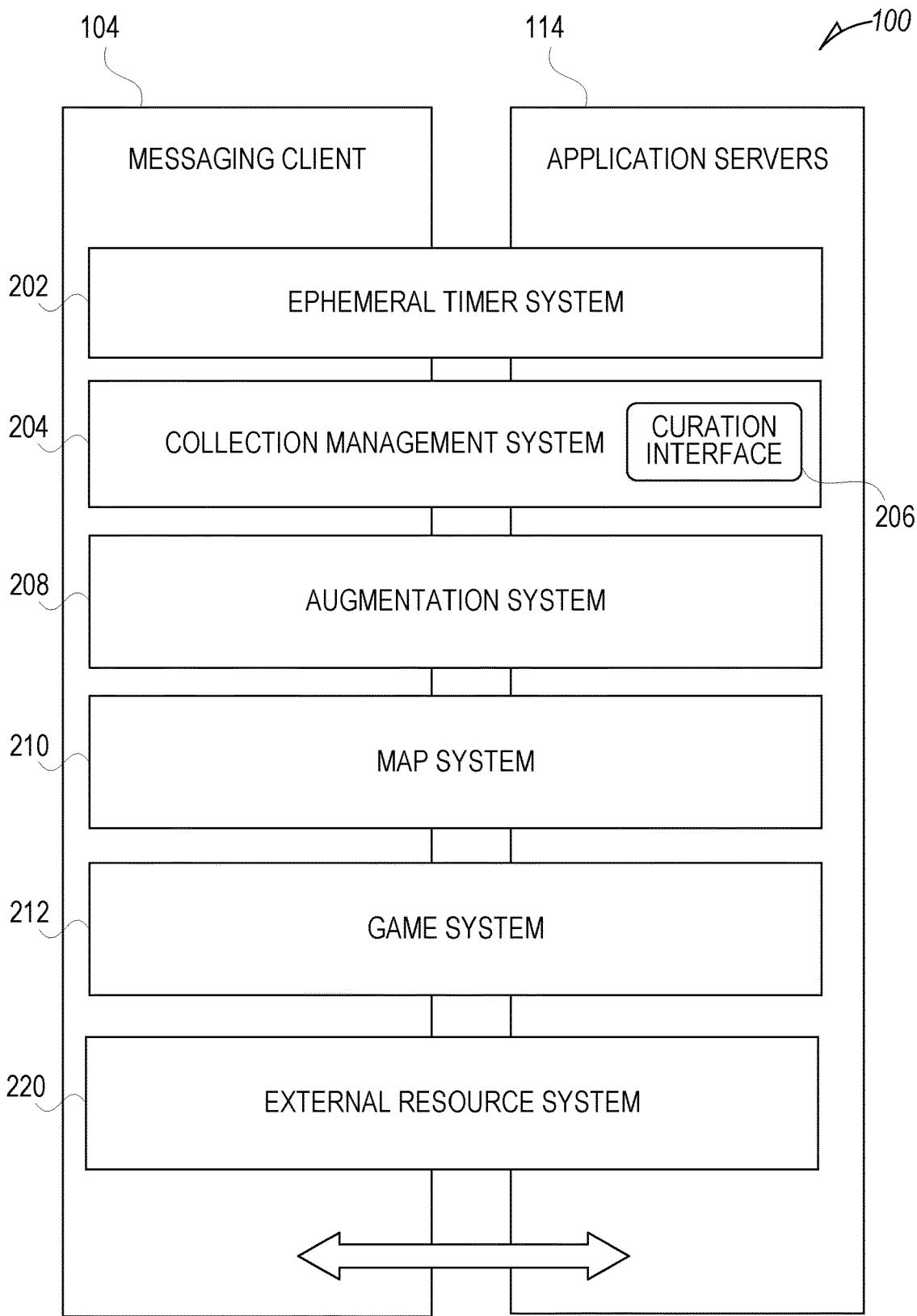
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

In some examples, the game system 212 is part of a gaming console that is associated with one or more gaming controllers. The gaming console can be part of the client device 102 or can be an entirely separate device. In some examples, the gaming console is coupled to a television or is part of a television. The game system 212 provides an API to the eyewear device 119 that allows the eyewear device 119 to receive information that identifies a gaming controller that is used with the gaming console. The eyewear device 119 can generate an AR representation of the gaming controller that includes the same buttons and layout of the buttons. This can allow a user to virtually interact with the AR gaming controller to have the same experience with the gaming console as if the real-world gaming controller was being used. The eyewear device 119 can detect positioning of the hands/fingers of a user relative to the buttons of the AR gaming controller and can select the corresponding gaming functions that match the buttons of the AR gaming controller over which the hands/fingers are placed. The eyewear device 119 can transmit gaming commands to the gaming console representing the gaming functions that are identified and selected.

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
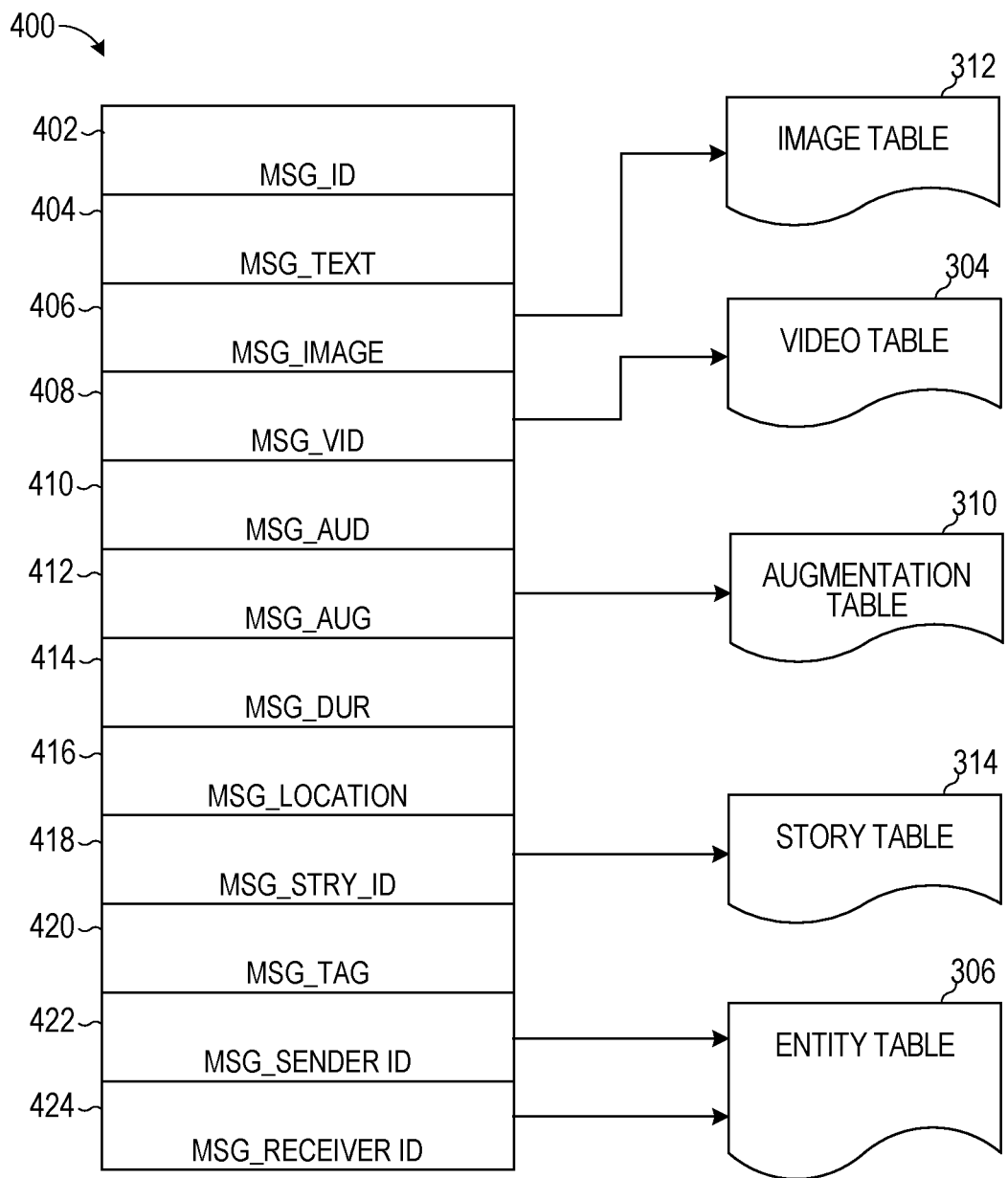
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400;
- message text payload 404: text, to be generated by a user via a user interface of the client device 102, and that is included in the message 400;
- message image payload 406: image data, captured by a camera component of a client device 102 or retrieved from a memory component of a client device 102, and that is included in the message 400. Image data for a sent or received message 400 may be stored in the image table 312;
- message video payload 408: video data, captured by a camera component or retrieved from a memory component of the client device 102, and that is included in the message 400. Video data for a sent or received message 400 may be stored in the video table 304;
- message audio payload 410: audio data, captured by a microphone or retrieved from a memory component of the client device 102, and that is included in the message 400;
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310;
- message duration parameter 414: parameter value indicating, in seconds, the amount of time for which content of the message (e.g., the message image payload 406, message video payload 408, message audio payload 410) is to be presented or made accessible to a user via the messaging client 104;
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408);
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values;
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition;

message sender identifier 422: an identifier (e.g., a messaging system identifier, email address, or device identifier) indicative of a user of the client device 102 on which the message 400 was generated and from which the message 400 was sent; and message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Eyewear Device

Figure 5:
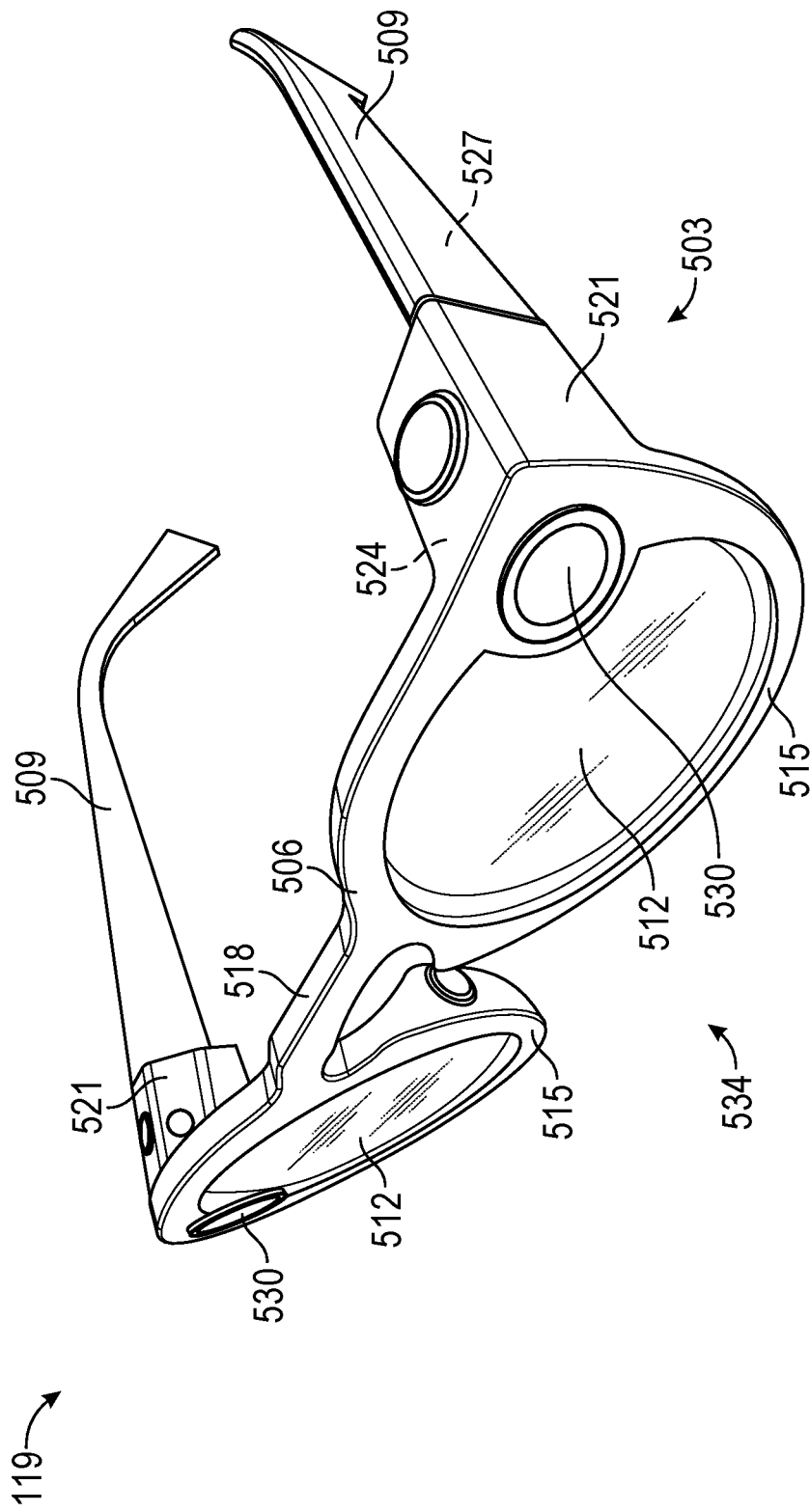
FIG. 5 is a perspective view of an eyewear device, according to some examples.

FIG. 5 shows a front perspective view of an eyewear device 119 in the form of a pair of smart glasses that include an external control system 107 according to some examples. The eyewear device 119 includes a body 503 comprising a front piece or frame 506 and a pair of temples 509 connected to the frame 506 for supporting the frame 506 in position on a user's face when the eyewear device 119 is worn. The frame 506 can be made from any suitable material such as plastics or metal, including any suitable shape memory alloy. The frame 506 can include a touch input interface that is configured to receive touch input from a user (e.g., one finger touch, two finger touch, or combination thereof together with dragging the finger(s) along the frame 506, such as lateral end pieces 521).

The eyewear device 119 includes a pair of optical elements in the form of a pair of lenses 512 held by corresponding optical element holders in the form of a pair of rims 515 forming part of the frame 506. The rims 515 are connected by a bridge 518. In other examples, one or both of the optical elements can be a display, a display assembly, or a lens and display combination.

The frame 506 includes a pair of end pieces 521 defining lateral end portions of the frame 506. In this example, a variety of electronics components are housed in one or both of the end pieces 521. The temples 509 are coupled to the respective end pieces 521. In this example, the temples 509 are coupled to the frame 506 by respective hinges so as to be hingedly movable between a wearable mode and a collapsed mode in which the temples 509 are pivoted towards the frame 506 to lie substantially flat against it. In other examples, the temples 509 can be coupled to the frame 506 by any suitable means, or can be rigidly or fixedly secured to the frame 506 so as to be integral therewith.

Each of the temples 509 includes a front portion that is coupled to the frame 506 and any suitable rear portion for coupling to the ear of the user, such as the curves illustrated in the example of FIG. 5. In some examples, the frame 506 is formed of a single piece of material, so as to have a unitary or monolithic construction. In some examples, the whole of the body 503 (including both the frame 506 and the temples 509) can be of the unitary or monolithic construction.

The eyewear device 119 has onboard electronics components including a computing device, such as a computer 524, or low power processor, which can in different examples be of any suitable type so as to be carried by the body 503. In some examples, the computer 524 is at least partially housed in one or both of the temples 509. In the present example, various components of the computer 524 are housed in the lateral end pieces 521 of the frame 506. The computer 524 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 524 comprises low-power circuitry, high-speed circuitry, and, in some examples, a display processor. Various examples may include these elements in different configurations or integrated together in different ways.

The computer 524 additionally includes a battery 527 or other suitable portable power supply. In one example, the battery 527 is disposed in one of the temples 509. In the eyewear device 119 shown in FIG. 5, the battery 527 is shown as being disposed in one of the end pieces 521, being electrically coupled to the remainder of the computer 524 housed in the corresponding end piece 521.

The eyewear device 119 is camera-enabled, in this example including a camera 530 mounted in one of the end pieces 521 and facing forwards so as to be aligned more or less with the direction of view of a wearer of the eyewear device 119. The camera 530 is configured to capture digital images (also referred to herein as digital photographs or pictures) as well as digital video content. Operation of the camera 530 is controlled by a camera controller provided by the computer 524, image data representative of images or video captured by the camera 530 being temporarily stored on a memory forming part of the computer 524. In some examples, the eyewear device 119 can have a pair of cameras 530, e.g., housed by the respective end pieces 521.

The onboard computer 524 and the lenses 512 are configured together to provide the external control system 107 that allows a user to control and interact with AR objects presented in the lenses 512 using the client device 102. Specifically, the lenses 512 can display virtual content, such as AR objects including an avatar, a gaming object, a wand, an orb, a cube, or any other suitable object together with one or more real-world objects of a real-world environment, such as the real-world client device 102. This makes it appear to the user that the virtual content is integrated within the real-world environment that the user views through the lenses 512. In some examples, the virtual content is received from the client device 102. In some examples, the virtual content is received directly from the application servers 114. In some examples, the virtual content is received from the game system 212.

The onboard computer 524 receives input from the user that drags or moves the AR objects into a particular display position, such as from interaction data received from the client device 102. The input can indicate whether the display position is anchored to a particular real-world object. In such cases, as the lenses 512 are moved to view a different portion of the real-world environment, the AR objects remain fixed in display positions to the particular real-world object and can be removed from view if the lenses 512 are turned or moved a sufficient distance away from the display position of the AR objects. In some examples, the display position is not anchored, in which cases as the lenses 512 are moved to view different portions of the real-world environment, the AR objects display positions are also updated to remain within view. This allows the user to move about their surroundings and consistently and continuously see the AR objects.

The eyewear device 119 includes an accelerometer and/or gyroscope and a touch interface and a voice command system. Based on input received by the eyewear device 119 from the accelerometer and a touch interface and the voice command system, the eyewear device 119 can control user interaction with the virtual content. The accelerometer and/or gyroscope can be used to determine movement and an orientation of a head of a wearer to generate movement information for an avatar of the wearer that is included and displayed in a voice-based communication session with another user.

The eyewear device 119 can include communication device(s) to communicate with a client device 102. Based on such communications with the client device 102, the eyewear device 119 can determine a real-world position of the client device 102 and physical movement of the client device 102 and interactions performed by the user with the client device 102. The eyewear device 119 can receive interaction data from the client device 102. Specifically, the client device 102 can capture movement information via one or more sensors, such as accelerometers and/or gyroscopes of the client device 102. The client device 102 can collect the movement information and generate interaction data that is provided to the eyewear device 119. The eyewear device 119 can process the interaction data to update, generate, and/or modify one or more AR objects displayed by the eyewear device 119.

The eyewear device 119 further includes one or more communication devices, such as Bluetooth low energy (BLE) communication interface. Such BLE communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol, the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then can be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some examples, the client device 102 communicates with the eyewear device 119 using the first protocol to exchange interaction data, images, videos and/or virtual content between the messaging client 104 and the eyewear device 119. In some examples, the client device 102 communicates with the eyewear device 119 using the second protocol to exchange interaction data, images, videos and/or virtual content between the messaging client 104 and the eyewear device 119.

External Control System

Figure 6:
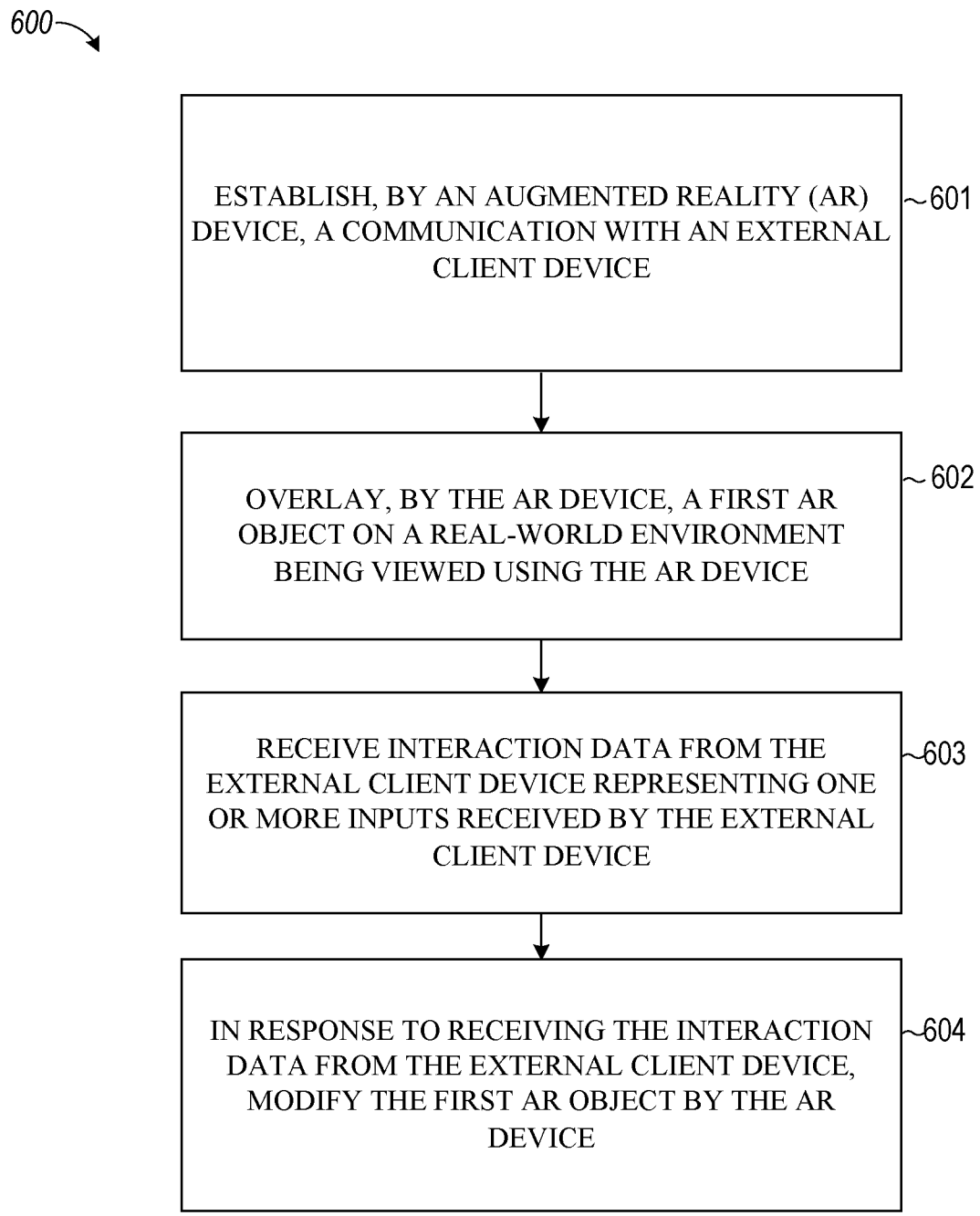
FIG. 6 is a flowchart showing example operations of the external control system of the eyewear device, according to some examples.

FIG. 6 is a flowchart illustrating example operations of the external control system 107 in performing a process 600, according to some examples. The process 600 may be embodied in computer-readable instructions for execution by one or more processors such that the operations of the process 600 may be performed in part or in whole by the functional components of the external control system 107; accordingly, the process 600 is described below by way of example with reference thereto. However, in other examples, at least some of the operations of the process 600 may be deployed on various other hardware configurations. The process 600 is therefore not intended to be limited to the external control system 107 and can be implemented in whole, or in part, by any other component. Some or all of the operations of process 600 can be in parallel, out of order, or entirely omitted.

At operation 601, the external control system 107 establishes, by the one or more processors of an AR device (e.g., eyewear device 119), a communication with an external client device (e.g., client device 102), as discussed above.

At operation 602, the external control system 107 overlays, by the AR device, a first AR object on a real-world environment being viewed using the AR device, as discussed above.

At operation 603, the external control system 107 receives interaction data from the external client device representing one or more inputs received by the external client device, as discussed above.

At operation 604, the external control system 107, in response to receiving the interaction data from the external client device, modifies the first AR object by the AR device, as discussed above.

FIGS. 7, 8, 9A and 9B are illustrative screens of the external control system 107 according to some examples. The screens shown in FIGS. 7, 8, 9A and 9B may be provided by the messaging client 104 of one or more client devices 102, other applications implemented on one or more client devices 102, and/or the eyewear device 119.

Figure 7:
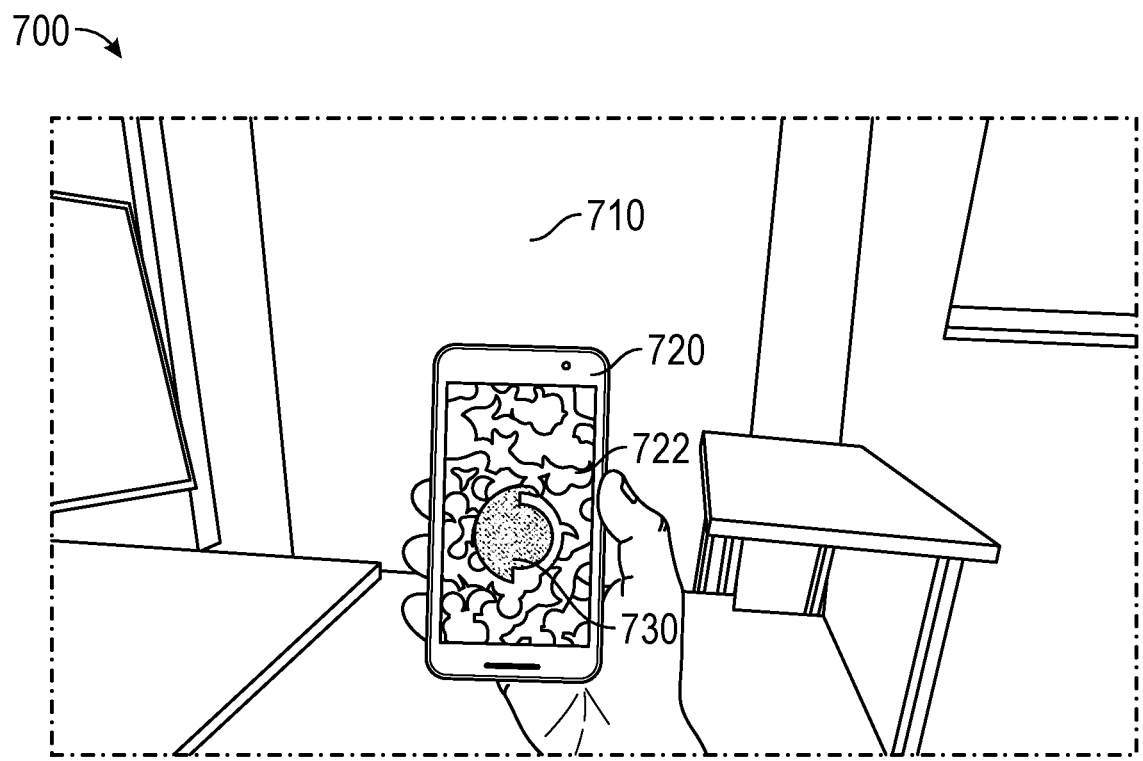
FIGS. 7, 8, 9A and 9B are illustrative screens of the external control system, according to some examples.

FIG. 7 shows a user interface 700 that is presented by the eyewear device 119. The user interface 700 includes a real-world environment 710. The real-world environment 710 includes mobile phone 720 (e.g., the client device 102). The eyewear device 119 can establish a common coordinate system with the mobile phone 720 via the user interface 700. Once the common coordinate system is established, the eyewear device 119 can exchange sensor and position information with the mobile phone 720. Namely, the mobile phone 720 can determine its current 3D position relative to the common coordinate system. The mobile phone 720 can transmit data to the eyewear device 119 indicating the 3D relative position of the mobile phone 720. In response, the eyewear device 119 can update one or more AR objects that are based on the 3D position of the mobile phone 720.

In some examples, to establish the common coordinate system, the eyewear device 119 instructs the mobile phone 720 to present a marker 722. The mobile phone 720 can present the marker 722 on the screen of the mobile phone 720. The eyewear device 119 can instruct the wearer or user of the eyewear device 119 to move the eyewear device 119 about the real-world environment 710 to bring the mobile phone 720 into view. The eyewear device 119 can detect when the mobile phone 720 is brought within view, such as by capturing images of the real-world environment 710 and applying one or more object recognition techniques (e.g., trained artificial neural networks) to the images to detect a depiction of the mobile phone 720. In some examples, the common coordinate system can be determined using machine learning techniques (e.g., one or more trained artificial neural networks) to determine the 3D pose of the client device 102 relative to the cameras of the eyewear device 119.

In some examples, once the mobile phone 720 is detected in one or more images captured by the eyewear device 119, the eyewear device 119 instructs the user to stop moving. At this point, the eyewear device 119 can instruct the mobile phone 720 to identify an origin point of the mobile phone 720 in 3D relative to a common coordinate system. Simultaneously, the eyewear device 119 identifies an origin point of the eyewear device 119 in 3D relative to a common coordinate system. A progress bar 730 can be presented on the mobile phone 720 indicating progress of the establishment of the common coordinate system. The mobile phone 720 and the eyewear device 119 exchange the origin points to establish the common coordinate system. In response to receiving the origin point of the eyewear device 119 relative to the common coordinate system, the mobile phone 720 updates the progress bar 730 to indicate that the common coordinate system has been successfully established.

Figure 8:
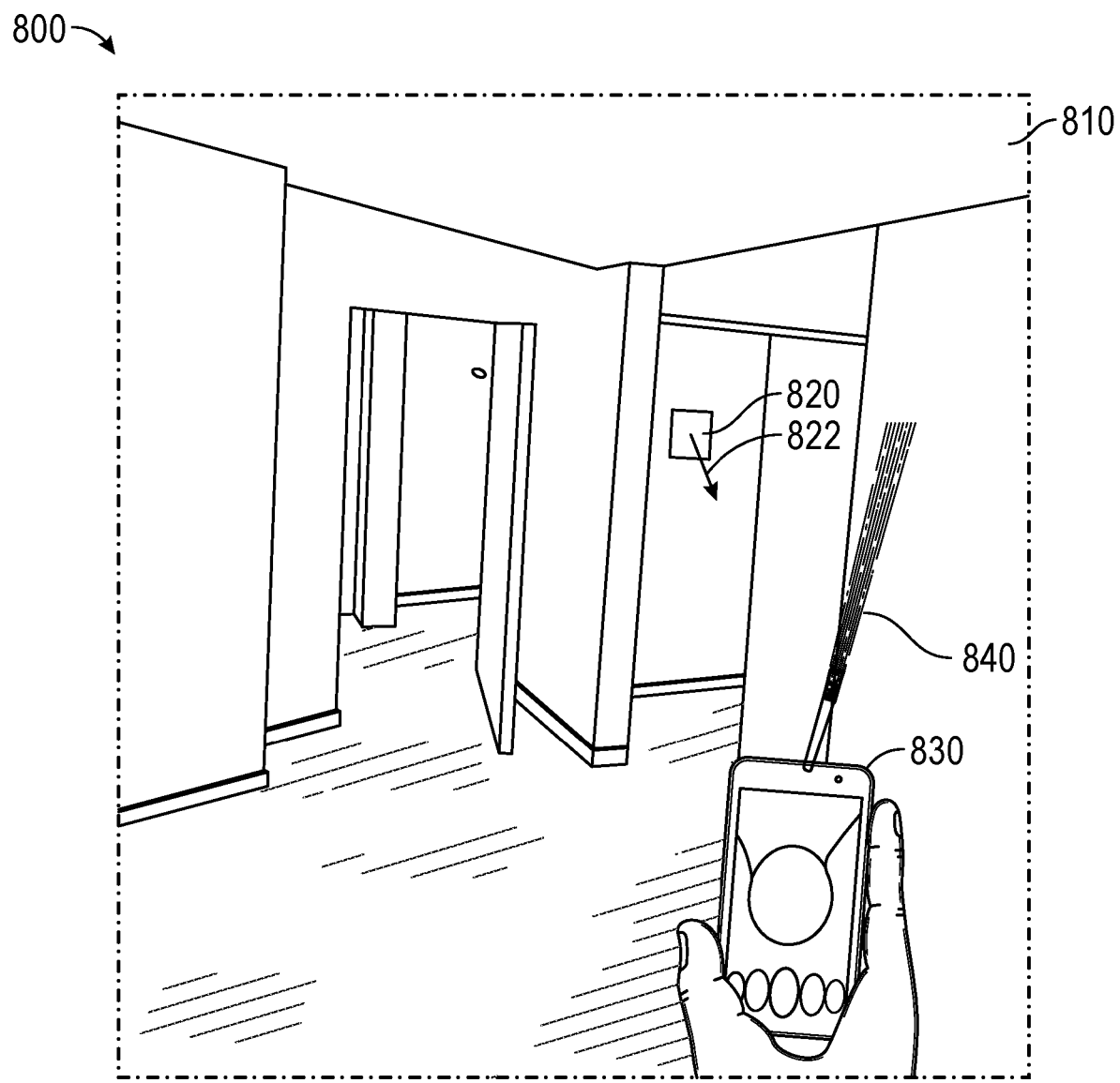
Figure 9A:
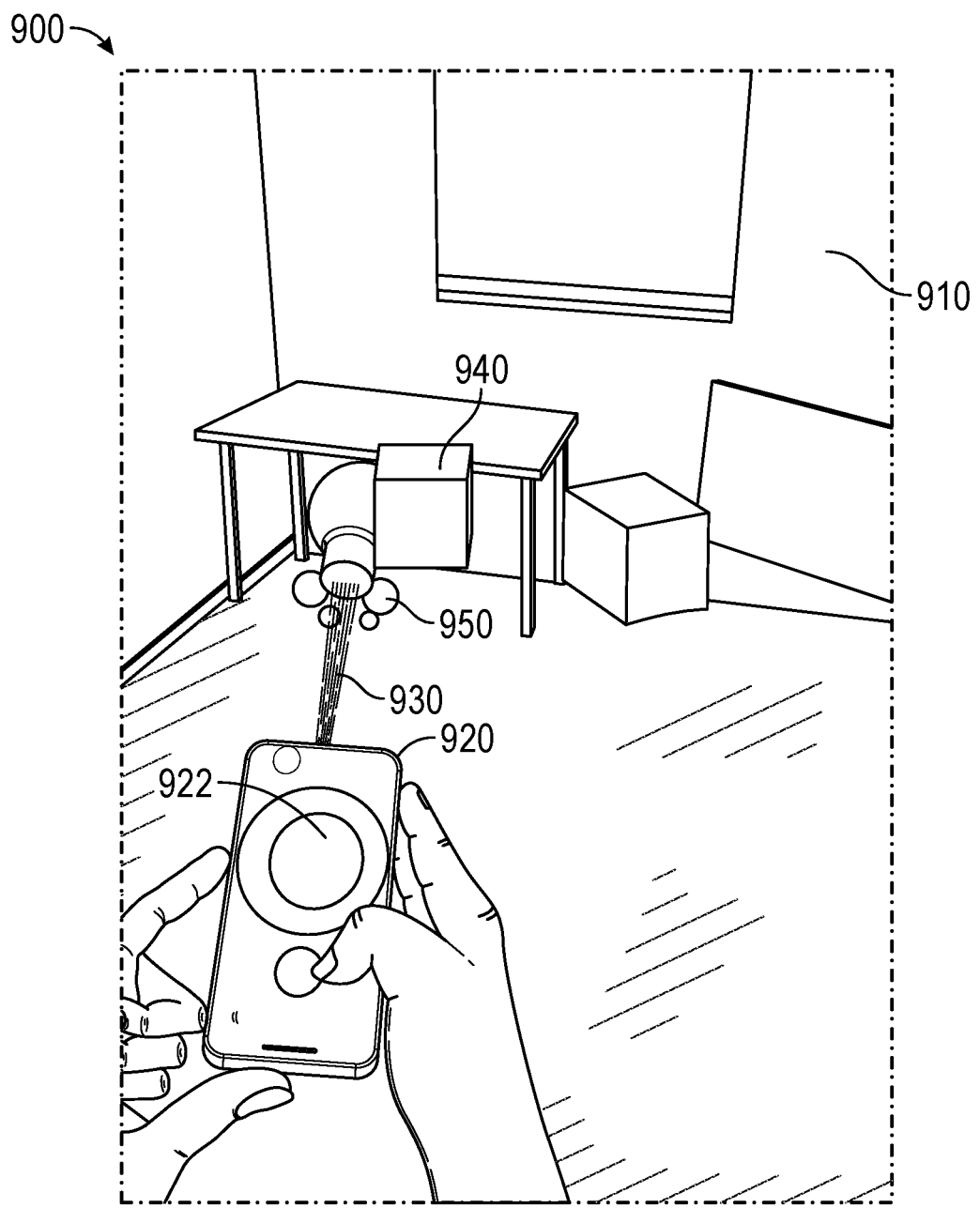
Figure 9B:
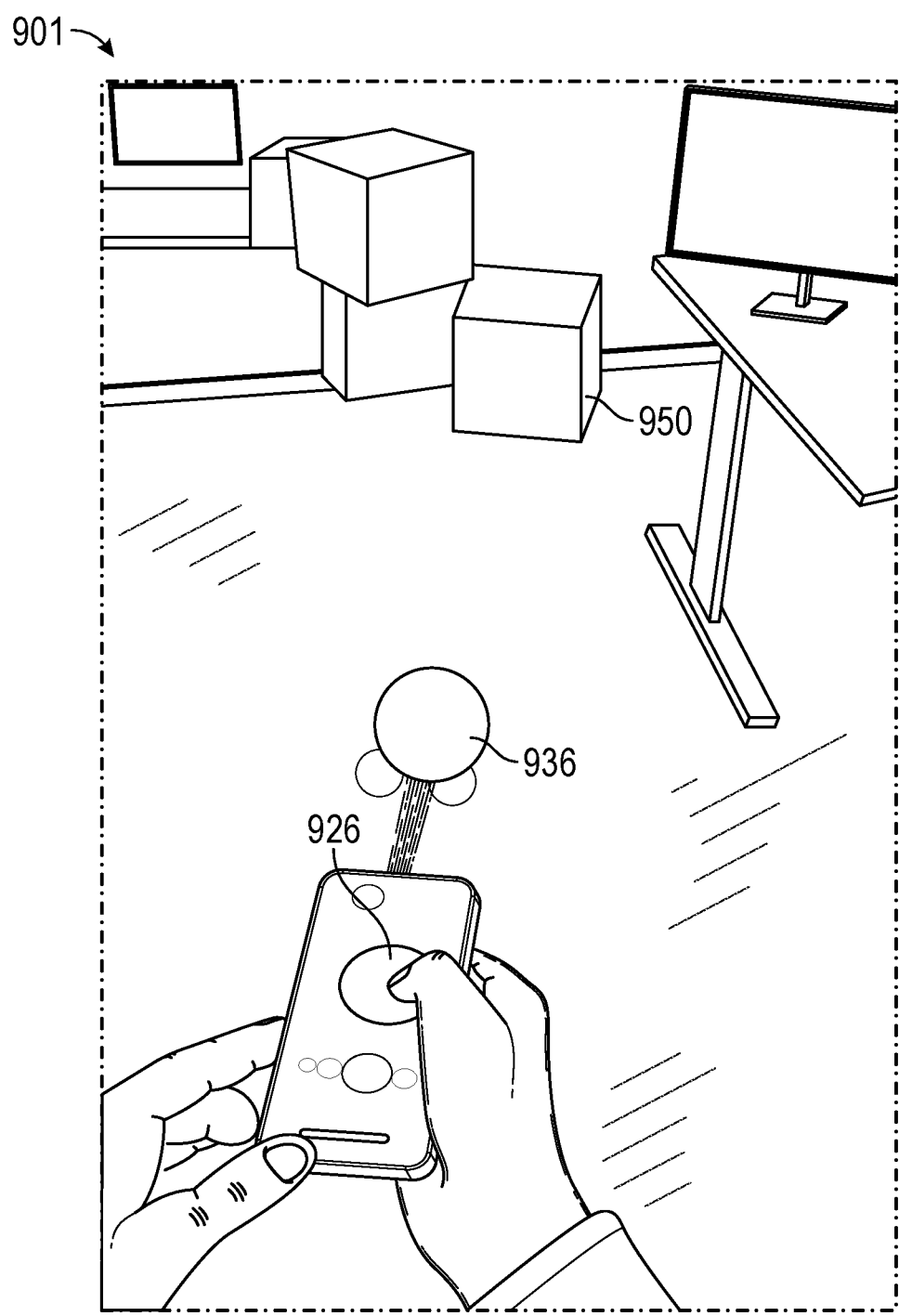

As shown in FIGS. 8, 9A, and 9B, the mobile phone 720 and the eyewear device 119 can communicate with each other relative to the common coordinate system to effectuate a display and modification of one or more AR objects within view of the eyewear device 119. For example, the eyewear device 119 can detect a depiction of the mobile device 830 in one or more images of the real-world environment 810 captured by the eyewear device 119. The mobile device 830 can receive input from a user requesting to play a game on a gaming console. The mobile device 830 can transmit an indication to the eyewear device 119 instructing the eyewear device 119 to generate an AR object that includes a gaming controller for the gaming console. The indication can include an identifier of the gaming console type.

The eyewear device 119 can access an API of the gaming console based on the gaming console type to retrieve an AR object representing a gaming controller for the gaming console. The eyewear device 119 can then select the gaming controller associated with the gaming console and present the game controller as an AR object on the real-world environment 810. In some examples, the eyewear device 119 can overlay the AR object on top of the mobile device 830.

The eyewear device 119 can capture a video feed that depicts the AR object and hands/fingers of a user. The hands/fingers of the user can be placed where the mobile device 830 was and relative to the AR object of the gaming controller.

In some examples, the eyewear device 119 can detect a position of the hand/fingers relative to one or more buttons of the AR object of the gaming controller. In response to detecting that the hand/fingers overlap one or more buttons of the AR object of the gaming controller, the eyewear device 119 identifies a gaming function corresponding to the one or more buttons. The eyewear device 119 can transmit a communication to the gaming console that identifies the gaming function corresponding to the buttons over which the hand/fingers were detected as overlapping. The gaming console can then perform a gaming function operation in a game being run on the gaming console.

In some examples, the eyewear device 119 can present an AR wand 840 over the real-world environment 810. The AR wand 840 can be placed anywhere within view of the real-world environment 810. In some cases, the AR wand 840 can be positioned relative to the mobile device 830 to appear as though the AR wand 840 is extending from the mobile device 830 towards the real-world environment 810. In some examples, the AR wand 840 comprises an AR beam that can be used to virtually mark or identify different portions of the real-world environment 810.

The mobile device 830 can detect movement of the mobile device 830 in 3D space by accessing sensor information. For example, the mobile device 830 can receive or access accelerometer measurements and/or gyroscopic measurements to determine an offset relative to the origin point in the common coordinate system. The offset can be used to identify a new point within the common coordinate system. The new point is transmitted from the mobile device 830 to the eyewear device 119. The eyewear device 119, in response to receiving the new point in the 3D space, updates the AR wand 840 and/or AR beam. For example, if the mobile device 830 is moved to the right relative to the eyewear device 119, the eyewear device 119 can move the AR wand 840 and/or AR beam to point towards the right. The eyewear device 119 can update the orientation of the AR wand 840 and/or AR beam in any direction that corresponds to the direction in 3D space along which the mobile device 830 has been detected by the mobile device 830 as moving.

In some examples, the eyewear device 119 captures one or more images of the mobile device 830. The eyewear device 119 applies one or more visual odometry processes on the captured images to track a 3D position of the mobile device 830 and determine changes in 3D positioning of the mobile device 830. Based on the changes in positioning, the eyewear device 119 can update the orientation of the AR wand 840 and/or AR beam in any direction that corresponds to the direction in 3D space along which the mobile device 830 has been detected as moving.

In some examples, the eyewear device 119 can propel or animate an AR object as moving along a particular trajectory and at a particular speed, velocity or rate based on movement of the mobile device 830. For example, the eyewear device 119 can present an AR object, such as an AR ball or orb within lenses of the eyewear device 119. The eyewear device 119 can receive interaction data from the mobile device 830 indicating movement of the mobile device 830 along a particular direction in 3D space. The interaction data can also indicate acceleration and/or speed or velocity measurements. The eyewear device 119 can then use the interaction data to animate movement of the AR ball or orb along the same direction as the direction indicated by the mobile device 830 and at the same speed, acceleration and/or velocity indicated by the interaction data. This makes it appear as though the AR object is being propelled in a particular direction that corresponds to the direction and rate of the movement of the mobile device 830.

In some examples, the eyewear device 119 can animate movement of an AR orb 820 towards a trajectory 822 in 3D space of the eyewear device 119. The eyewear device 119 can extend an AR wand 840 from the mobile device 830. The eyewear device 119 can update positioning and orientation of the AR wand 840 based on movement information or interaction data received from the mobile device 830. The eyewear device 119 can determine that a current position of the AR wand 840 within 3D space overlaps or intersects the current position of the AR orb 820. This can indicate that the AR wand 840 has made virtual contact with the AR orb 820. In response, the eyewear device 119 can update the trajectory 822 such as to make it appear as though the AR orb 820 falls to the floor or is sent in the opposite direction than the trajectory 822 initially being animated as going towards the eyewear device 119.

In some examples, the eyewear device 119 can modify a display or visual characteristics or attributes of one or more AR objects based on options that are selected on the client device 102. These types of interactions are shown in FIGS. 9A and 9B.

For example, as shown in the user interface 900 of FIG. 9A, the eyewear device 119 is used to view a real-world environment 910. The real-world environment 910 includes a real-world mobile device 920. The real-world mobile device 920 can present an option 922 for generating and/or controlling an AR object 940 that is displayed within lenses of the eyewear device 119. Specifically, the real-world mobile device 920 can receive input that taps on the option 922. In response, the real-world mobile device 920 sends interaction data to the eyewear device 119 indicating that the user tapped or selected the option 922. The eyewear device 119, in response to receiving the interaction data, can add the AR object 940 to the display in the lenses to overlay the real-world environment 910.

In some cases, the eyewear device 119 can generate an AR wand 930 that extends away from the real-world mobile device 920. The eyewear device 119 can animate the AR object 940 as shooting out from the AR wand 930. The AR object 940 can be animated as shooting out from the AR wand 930 in a direction along which the AR wand 930 is pointing.

In some examples, the real-world mobile device 920 receives input that includes a swipe gesture. The swipe gesture can include dragging a finger left/right along the screen of the real-world mobile device 920. The real-world mobile device 920 can send interaction data to the eyewear device 119 indicating the direction in which the finger was swiped. The eyewear device 119 can, in response to the interaction data, modify one or more visual properties of the AR wand 930. For example, the eyewear device 119 can modify a type of AR object 940 that shoots out of the AR wand 930, a color of the AR wand 930 and the AR object 940, and/or a pattern associated with the AR wand 930 or AR object 940. In some examples, the AR object 940 can represent an avatar or character in a game. In response to receiving interaction data from the real-world mobile device 920 indicating tapping or selection of the option 922, the eyewear device 119 can bounce, move or otherwise animate the avatar or character in the game to perform a specified action or operation.

In some examples, in response to determining that the interaction data indicates that the real-world mobile device 920 received a swipe in the left direction, the eyewear device 119 displays an AR 3D carousel 950 that includes one or more icons representing the different visual properties of the AR wand 930. The AR 3D carousel 950 can centered on the AR wand 930 and can be rotated about the AR wand 930 in a direction corresponding to the direction of the swipe indicated by the real-world mobile device 920. The rate at which the 3D carousel 950 rotates can correspond to the speed or rate at which the swipe gesture is performed and indicated in the interaction data received from the real-world mobile device 920. In some examples, a first AR object with a first visual property corresponding to an icon selected by rotating the 3D carousel 950 can be added to the real-world environment 910 in response to a first tap or input detected by the real-world mobile device 920. Then, a second AR object with a second visual property (different from the first visual property) corresponding to another icon selected by rotating the 3D carousel 950 can be added to the real-world environment 910 in response to a second tap or input detected by the real-world mobile device 920. The first and second AR objects can be presented in the real-world environment 910 simultaneously.

In some examples, the real-world mobile device 920 can be used to modify an orientation, size, 3D position, or animation associated with the AR object displayed by the eyewear device 119. For example, as shown in the user interface 901 of FIG. 9B, the real-world mobile device 920 can detect or receive input that touches and holds the option 926. In some cases, in response to receiving the input that touches and holds the option 926, the real-world mobile device 920 instructs the eyewear device 119 to display an icon 936 representing movement of an AR object.

In some cases, the real-world mobile device 920 can detect input that drags the option 926 up/down after touching and holding the option 926. In such cases, the interaction data sent to the eyewear device 119 can instruct the eyewear device 119 to modify a 3D depth or position in the real-world environment. For example, dragging the option 926 up on the screen of the real-world mobile device 920 can cause the eyewear device 119 to reduce an aspect ratio of the AR object 942 (or increase the depth of the AR object 942) and send the AR object 942 further into the real-world environment away from the eyewear device 119. Dragging the option 926 down the screen of real-world mobile device 920 can cause the eyewear device 119 to increase an aspect ratio of the AR object 942 (or decrease the depth of the AR object 942) and send the AR object 942 closer into the real-world environment towards from the eyewear device 119.

In some cases, dragging the option 926 from side to side can instruct the eyewear device 119 to rotate the AR object 942 in a corresponding direction. For example, dragging the option 926 left on the screen of real-world mobile device 920 can cause the eyewear device 119 to rotate of the AR object 942 left in 3D. For example, dragging the option 926 right on the screen of real-world mobile device 920 can cause the eyewear device 119 to rotate of the AR object 942 right in 3D. The speed or rate at which the AR object 942 is rotated can correspond to the speed or rate at which the option 926 is dragged left/right.

Machine Architecture

Figure 10:
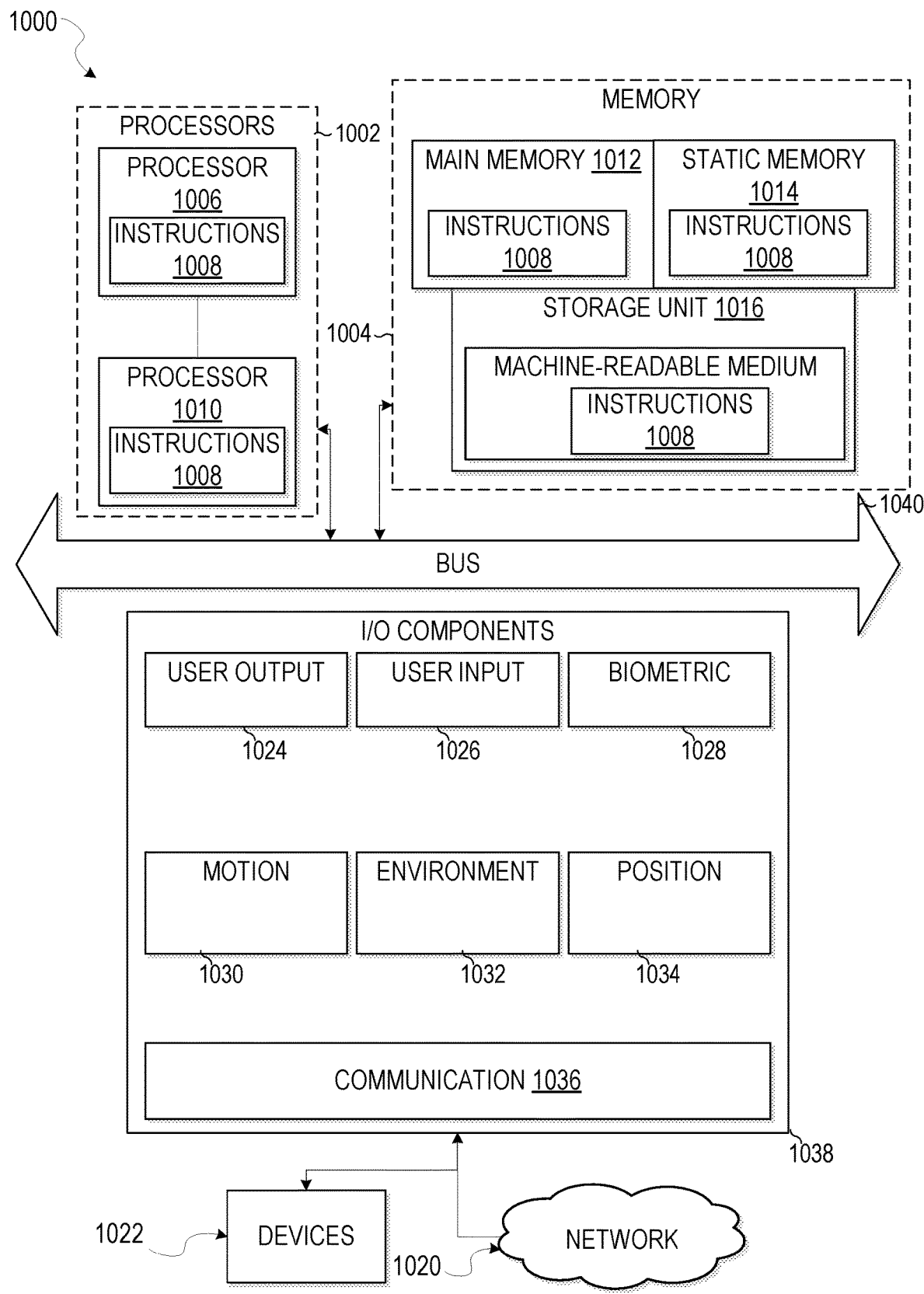
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
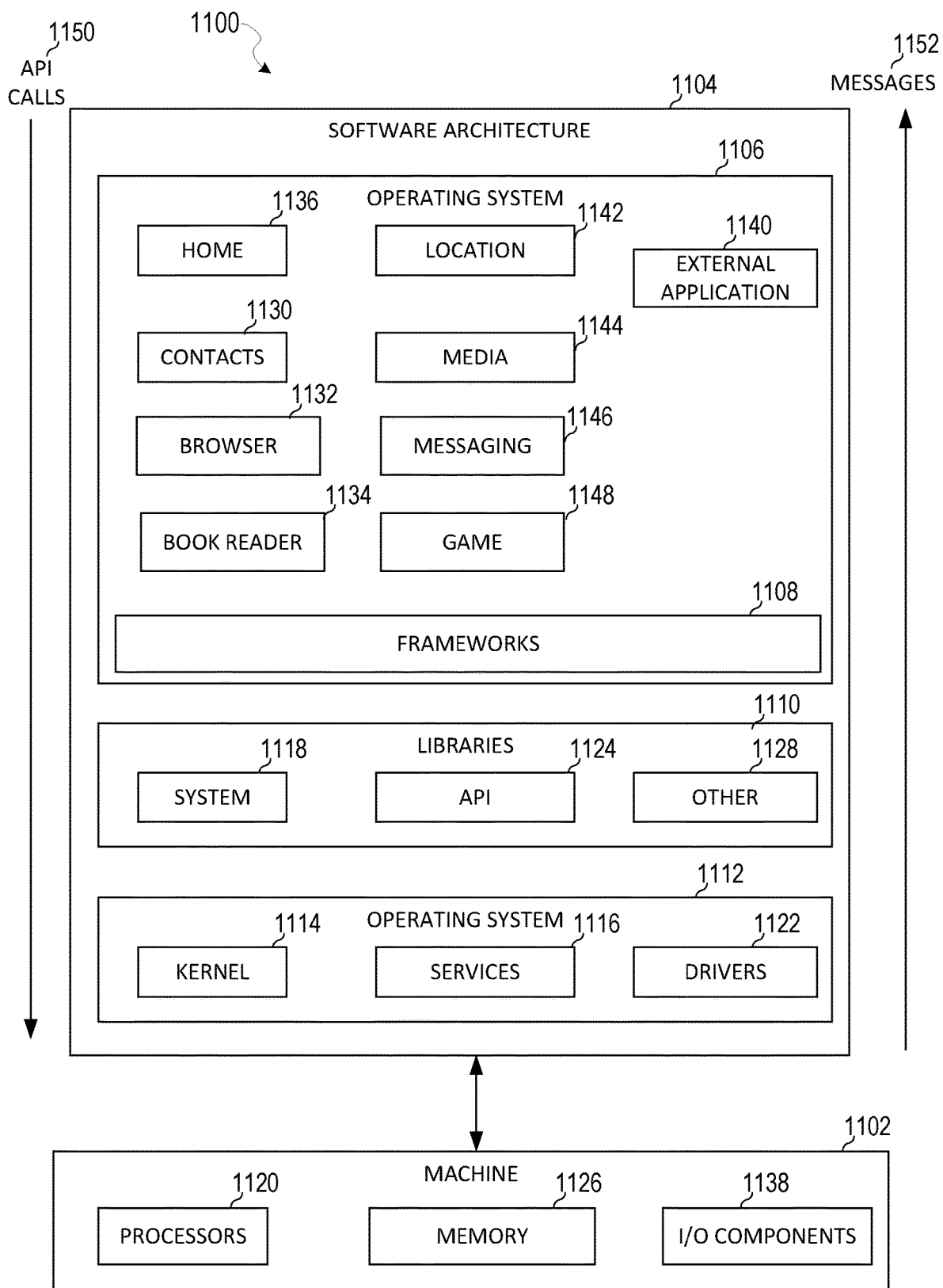
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

Modules, Components, and Logic

Certain examples are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various examples, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some examples, the processors or processor-implemented modules are located in a single geographic location (e.g., within a home environment, an office environment, or a server farm). In other examples, the processors or processor-implemented modules are distributed across a number of geographic locations.

What is claimed is:

1. A method comprising:
    establishing, by one or more processors of an augmented reality (AR) device, a communication with an external user device;
    overlaying, by the AR device, a first AR object on a real-world environment being viewed using the AR device;
    receiving interaction data from the external user device representing one or more inputs received by the external user device;
    in response to receiving the interaction data from the external user device, modifying the first AR object by the AR device;
    determining that the interaction data indicates that a swipe input has been received by the external user device, the swipe input causing a 3D carousel to be animated representing different visual properties of the first AR object; and
    changing a visual property of the first AR object in response to determining that the interaction data indicates that the swipe input has been received by the external user device.

2. The method of claim 1, wherein the external user device comprises a smartphone, and wherein the AR device comprises an AR eyewear device.

3. The method of claim 1, further comprising:
    detecting, by the AR device, a depiction of the external user device in one or more images of the real-world environment captured by the AR device;
    selecting a game controller associated with an external gaming console; and
    presenting the game controller as the first AR object on top of the depiction of the external user device in the one or more images.

4. The method of claim 3, further comprising:
    detecting, by the AR device, a depiction of one or more fingers on a portion of the game controller;
    identifying one or more buttons of the game controller at a position where the depiction of the one or more fingers is detected; and
    performing a gaming function corresponding to the identified one or more buttons on the external gaming console.

5. The method of claim 4, further comprising:
    transmitting, by the AR device, a communication to the external gaming console that identifies the gaming function corresponding to the identified one or more buttons over which the depiction of the one or more fingers is detected.

6. The method of claim 1, wherein the real-world environment being viewed using the AR device comprises the external user device, and wherein the first AR object comprises an AR beam that extends away from the external user device.

7. The method of claim 6, further comprising:
    detecting three-dimensional (3D) movement of the external user device based on the received interaction data; and updating a direction of the AR beam based on the 3D movement.

8. The method of claim 7, wherein the external user device receives sensor data comprising at least one of one or more accelerometer measurements or one or more gyroscopic measurements, and wherein the external user device generates the interaction data based on the sensor data.

9. The method of claim 7, wherein detecting the 3D movement comprises:
receiving one or more images depicting the external user device by a camera of the AR device; and
applying image processing comprising visual odometry to the one or more images to track a position of the external user device in 3D space.

10. The method of claim 1, wherein the real-world environment being viewed using the AR device comprises the external user device, further comprising:
detecting three-dimensional (3D) movement of the external user device based on the received interaction data, the interaction data being generated based on sensor data comprising at least one of one or more accelerometer measurements or one or more gyroscopic measurements; and
propelling the first AR object towards a direction of the 3D movement at a rate corresponding to a rate of the 3D movement.

11. The method of claim 1, further comprising:
causing the external user device to display a marker;
capturing an image by the AR device of the marker displayed by the external user device; and
establishing a common coordinate system between the external user device and the AR device in response to capturing the image of the marker.

12. The method of claim 1, further comprising:
overlaying a second AR object comprising a wand on the real-world environment being viewed using the AR device;
animating movement of the first AR object towards the AR device along a trajectory;
detecting, based on the interaction data, movement of the external user device;
using a common coordinate system to determine a current 3D position of the external user device based on the detected movement; and
updating an orientation of the second AR object based on the detected movement and the current 3D position.

13. The method of claim 12, further comprising:
determining that the current 3D position of the external user device causes the updated orientation of the second AR object to correspond to a current position of the first AR object; and
in response to determining that the updated orientation of the second AR object corresponds to the current position of the first AR object, modifying the trajectory of the first AR object.

14. The method of claim 1, further comprising:
causing the external user device to display an option on a screen of the external user device;
determining that the interaction data indicates that the option has been selected on the external user device; and
in response to determining that the interaction data indicates that the option has been selected on the external user device, causing the first AR object to be presented on the AR device.

15. The method of claim 1, further comprising:
causing the external user device to display an option on a screen of the external user device;
determining that the interaction data indicates that the option continues to be selected on the external user device by a press-and-hold operation; and
in response to determining that the interaction data indicates that the option continues to be selected on the external user device, presenting a trackpad on the external user device comprising one or more options to change a 3D position of the first AR object.

16. The method of claim 15, further comprising:
rotating the first AR object about an axis of the first AR object in response to a first swipe motion along a first direction of the trackpad; and
modifying a perceived distance between the first AR object and the AR device in response to a second swipe motion along a second direction of the trackpad.

17. A system comprising:
at least one processor of an augmented reality (AR) device configured to perform operations comprising:
establishing a communication with an external user device;
overlaying, by the AR device, a first AR object on a real-world environment being viewed using the AR device;
receiving interaction data from the external user device representing one or more inputs received by the external user device;
in response to receiving the interaction data from the external user device, modifying the first AR object by the AR device;
determining that the interaction data indicates that a swipe input has been received by the external user device, the swipe input causing a 3D carousel to be animated representing different visual properties of the first AR object; and
changing a visual property of the first AR object in response to determining that the interaction data indicates that the swipe input has been received by the external user device.

18. A non-transitory machine-readable storage medium comprising instructions that, when executed by one or more processors of a machine, cause the machine to perform operations comprising:
establishing, by the one or more processors of an augmented reality (AR) device, a communication with an external user device;
overlaying, by the AR device, a first AR object on a real-world environment being viewed using the AR device;
receiving interaction data from the external user device representing one or more inputs received by the external user device;
in response to receiving the interaction data from the external user device, modifying the first AR object by the AR device;
determining that the interaction data indicates that a swipe input has been received by the external user device, the swipe input causing a 3D carousel to be animated representing different visual properties of the first AR object; and
changing a visual property of the first AR object in response to determining that the interaction data indicates that the swipe input has been received by the external user device.

19. The non-transitory machine-readable storage medium of claim 18, wherein the external user device comprises a smartphone, and wherein the AR device comprises an AR eyewear device.

20. The non-transitory machine-readable storage medium of claim 18, wherein the external user device determines a first origin three-dimensional (3D) position of the external user device relative to a common coordinate system based on a current measurement obtained from one or more sensors of the external user device, and the AR device determining a second origin 3D position of the AR device relative to the common coordinate system based on a position of a marker displayed by the external user device.

* * * * *